June 30, 1953     E. L. McBRIDE     2,643,900
KNUCKLE JOINT
Filed Aug. 24, 1950
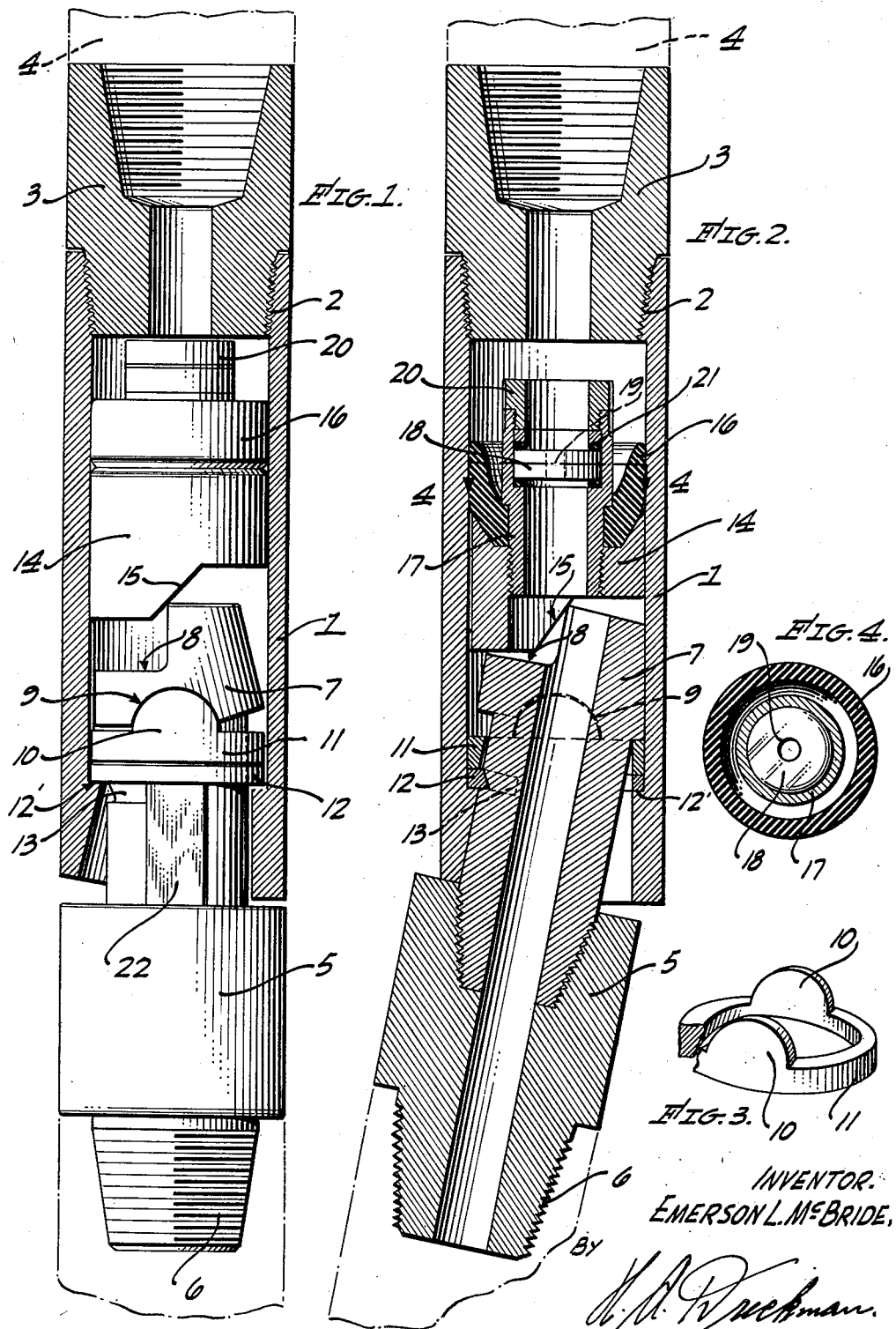
INVENTOR.
EMERSON L. McBRIDE,
BY
ATTORNEY.

Patented June 30, 1953

2,643,900

UNITED STATES PATENT OFFICE 2,643,900

KNUCKLE JOINT

Emerson L. McBride, Bakersfield, Calif.

Application August 24, 1950, Serial No. 181,285

2 Claims. (Cl. 285—93)

This invention relates to a knuckle joint for use in oil wells and particularly for the purpose of fishing and especially to recover a broken section of pipe tubing, rods, or the like.

An object of my invention is to provide a novel knuckle joint, which is effectively packed off in all positions of the movable sub.

Another object of my invention is to provide a novel trunnion ring which supports the movable sub, this ring being removable and replaceable when worn.

A feature of my invention resides in the novel means to restrict the flow of drilling mud through the tool, this restricting means being removable by breaking the same when it is desired to limit this restriction.

Still another feature of my invention is to provide a novel knuckle joint of the character stated, which is effective in operation and will perform its desired function without failure.

Other objects, advantages and features of invention may appear from the accompanying drawing, the subjoined detailed description and the appended claims.

In the drawing—

Figure 1 is a partial longitudinal sectional view with the interior parts shown in elevation.

Figure 2 is a longitudinal sectional view of my knuckle joint with the sub in angular position.

Figure 3 is a perspective view of the trunnion ring and partially in section.

Figure 4 is a sectional view taken on line 4—4 of Figure 2.

Referring more particularly to the drawing, the numeral 1 indicates a tubular housing, the upper end of which is threaded, as shown at 2, to receive a threaded box 3, into which the drill pipe 4 is threaded, all of which is usual and well known in the art.

A sub 5 is tiltably mounted in the lower part of the housing 1, and this sub is provided with a threaded pin 6, which can screw into the lost pipe in the well, or a fishing tool can be attached thereto which will engage and recover the lost pipe, tubing, or the like.

A head 7 is formed on the upper end of the sub 5, or may be fixedly attached thereto. This head is formed with a recess 8 in one side thereof, the purpose of which will be subsequently described. The head 7 is also formed with arcuate bearing surfaces 9, which rest on the arcuate bearings 10—10 of the trunnion ring 11. The trunnion ring 11 fits within the bore of the housing 1 and rests on a gasket or packing ring 12. The sub 5 is provided with an arcuate groove or recess 13 below the gasket 12, and this recess permits the gasket to move therein when the sub is tilted, as shown in Figure 2, thus an effective seal is provided around the top of the sub 5. Even though the sub itself is tilted, this prevents the drilling mud or other pressure fluid from leaking around the outside of the sub. The packing 12 rests on a shoulder 12' on the inside of the housing 1.

A piston 14 is slidably mounted in the housing 1, above the sub 5 and below the box 3. This piston is provided with a cam surface 15 on the bottom thereof, and this cam engages the upper edge of the head 7 for the purpose of pressing the head to one side and thus tilting the sub 5 on the bearings 10, as is shown in Figure 2. The recess 8 in the head 7 permits the cam 15 to move downwardly when it is pressing the head to one side.

A flexible cup packing 16 is mounted on the piston 14 and is preferably held in position by the sleeve 17, which screws into the piston. A disk 18, formed of a frangible material, such as glass, is provided with a small central hole 19, which restricts the flow of drilling mud and enables a pressure to be maintained above the disk 18 so that the piston 14 can be forced downwardly. The disk 18 is held in position by the nut 20, which screws into the upper end of the sleeve 17, and bears against the gasket 21 on top of the disk.

The gasket 21 is preferably so constructed that it creates a tension in the disk 18, thus enabling this disk to be readily broken by dropping a suitable tool into the drill pipe.

To prevent the sub 5 from rotating in the housing 1, I provide the sub with flat surfaces 22, on each side thereof, thus enabling the sub to tilt in one plane only.

A further definite advantage for the gasket 12 is the fact that at times there are large fragments of hard shale floating in the drilling mud as well as sand, and these products will foul a tool of this type. The gasket 12 will prevent this difficulty. Further, after the gasket is compressed by the ring 11 and when the sub 5 is in tilted position, the sub will tend to be forced back into vertical alignment when pressure is relieved from this sub, that is the rubber gasket 12 will act as a spring.

The actual or positive pack-off of the tool is made after the fish is engaged. On upward pull of the drill pipe, the gasket 12 will be squeezed against the inside wall of the housing 1 and also inwardly around the outer surface of the sub 5.

Having described my invention, I claim:

1. A knuckle joint comprising a housing, a threaded box on the upper end of said housing, a sub tiltably mounted in the lower end of said housing, said sub projecting from the housing, a piston in the housing above the sub, a cam surface on the bottom of said piston, a shoulder on the sub engageable by the cam surface to tilt said sub, a trunnion ring removably mounted in the housing, a head on the sub, said head having arcuate bearing surfaces thereon engaging the trunnion ring to support the sub in the housing, a packing ring positioned under the trunnion ring and supporting said trunnion ring, said sub having an arcuate recess therein on one side thereof, said packing extending into said recess in the tilted position of the sub.

2. A knuckle joint comprising a housing, a threaded box on the upper end of said housing, a sub tiltably mounted in the lower end of said housing, said sub projecting from the housing, a piston in the housing above the sub, a cam surface on the bottom of said piston, a shoulder on the sub engageable by the cam surface to tilt said sub, a trunnion ring removably mounted in the housing, a head on the sub, said head having arcuate bearing surfaces thereon engaging the trunnion ring to support the sub in the housing, a packing ring positioned under the trunnion and supporting said trunnion, said sub having an arcuate recess therein on one side thereof, said packing extending into said recess in the tilted position of the sub, said piston having an opening extending longitudinally therethrough, a frangible disk mounted in said opening, said disk having a hole extending therethrough.

EMERSON L. McBRIDE.

References Cited in the file of this patent

UNITED STATES PATENTS

| Number | Name | Date |
|---|---|---|
| 1,908,174 | O'Grady | May 9, 1933 |
| 2,103,988 | Le Bus | Dec. 28, 1937 |